United States Patent
Zalitzky et al.

(10) Patent No.: US 6,927,672 B2
(45) Date of Patent: Aug. 9, 2005

(54) INFORMATION TRANSMISSION OVER POWER LINES

(75) Inventors: Yeshayahu Zalitzky, Raanana (IL); Jacob Keret, Kfar-Shmaryahu (IL)

(73) Assignee: Main.net Communications Ltd., Kfar-Saba (IL)

(*) Notice: Subject to any disclaimer, the term of this patent is extended or adjusted under 35 U.S.C. 154(b) by 217 days.

(21) Appl. No.: 10/612,357

(22) Filed: Jul. 2, 2003

(65) Prior Publication Data

US 2004/0032320 A1 Feb. 19, 2004

Related U.S. Application Data

(63) Continuation-in-part of application No. PCT/IL02/00454, filed on Jun. 12, 2002.
(60) Provisional application No. 60/297,643, filed on Jun. 12, 2001.

(51) Int. Cl.[7] ............................................. H04M 11/04
(52) U.S. Cl. ........................... 340/310.07; 340/310.01; 375/259
(58) Field of Search .................. 340/310.01–310.08; 375/258, 259; 333/24 R

(56) References Cited

U.S. PATENT DOCUMENTS

| | | | |
|---|---|---|---|
| 4,644,321 A | | 2/1987 | Kennon |
| 4,709,339 A | * | 11/1987 | Fernandes .................. 700/293 |
| 4,745,391 A | * | 5/1988 | Gajjar ..................... 340/310.07 |
| 5,485,040 A | | 1/1996 | Sutterlin |
| 5,559,377 A | * | 9/1996 | Abraham ..................... 307/104 |
| 5,594,431 A | | 1/1997 | Sheppard et al. |
| 5,892,795 A | * | 4/1999 | Paret .......................... 375/222 |
| 5,933,073 A | | 8/1999 | Shuey |
| 6,114,849 A | | 9/2000 | Price et al. |
| 6,329,808 B1 | | 12/2001 | Enguent |
| 6,407,987 B1 | * | 6/2002 | Abraham ..................... 370/295 |
| 6,452,482 B1 | * | 9/2002 | Cern ........................ 340/310.01 |
| 6,529,120 B1 | * | 3/2003 | Bilenko et al. ......... 340/310.06 |

FOREIGN PATENT DOCUMENTS

| | | |
|---|---|---|
| EP | 0 242 779 | 10/1987 |
| GB | 2 048 622 | 12/1980 |
| SU | 554623 | 4/1977 |
| WO | WO 92/16920 | 10/1992 |
| WO | WO 98/20658 | 5/1998 |

* cited by examiner

Primary Examiner—Brent A. Swarthout
Assistant Examiner—Eric Blount
(74) Attorney, Agent, or Firm—Fenster & Company

(57) ABSTRACT

A method of transmitting data over lines of power line network comprising: inductively generating opposite polarity currents representing the data on first and second lines of a pair of lines of the network at a first location along the lines that propagate along the lines; and sensing the propagated currents at a second location along the lines.

71 Claims, 9 Drawing Sheets

INFORMATION TRANSMISSION OVER POWER LINES

RELATED APPLICATIONS

The present application is a continuation-in-part (CIP) of PCT Application No. PCT/IL02/00454, filed on Jun. 12, 2002, which claims the benefit under 35 U.S.C. §119(e) of U.S. Provisional Application No. 60/297,643, filed on Jun. 12, 2001, the disclosure of which is incorporated herein by reference.

FIELD OF THE INVENTION

The invention relates to transmission of data and in particular to transmission of data over power lines.

BACKGROUND OF THE INVENTION

It is known to use power lines and power line networks to transmit data. An industry standard protocol referred to as CEBus has been established for data transmission between appliances sensors and control devices in a household over the power network in the household. Utility companies use power lines to transmit data to control and monitoring base stations from sensors that monitor power line equipment, such as transformers and switches, and/or power line operating conditions at different locations along a power line.

Transmitters and receivers (hereinafter denoted collectively as "T/R"s) used to transmit and receive data over a low power line network (up to about 250 volts), such as a typical household network, are often electrically connected to power lines in the network via direct conductive contact with the power lines. For high and medium voltage power line networks, such connections are generally undesirable. Connecting a T/R to such power line by direct conductive contact is usually labor intensive and can often be dangerous.

U.S. Pat. No. 5,933,073 to Shuey, the disclosure of which is incorporated herein by reference, describes a communication system that transmits data over power lines in a household power network in which T/Rs are connected via conductive contacts to a power line and a ground line in the network. U.S. Pat. No. 5,485,040 to Sutterlin, the disclosure of which is incorporated herein by reference, describes a communication system in which "power line communication apparatus" is electrically connected via conductive contacts to the "hot" line and neutral line of a power network of a household to transmit data over the network.

Russian Patent SU 554623, the disclosure of which is incorporated herein by reference, describes a system for generating signals on power lines of a first power line network responsive to signals received on power lines of a second power line network. The first and second power line networks are connected by a power transformer and the system routes the signals from the second power line network around the power transformer. Signals on the second power network are inductively sensed. The system is coupled to power lines in the first power line network using conductive contacts.

PCT Publication WO 98/20658, the disclosure of which is incorporated herein by reference, describes a "Non-Invasive Powerline Communication System" in which T/Rs are coupled capacitively or inductively to a power line in a power line system to transmit and sense signals. Signals are transmitted between a first and a second T/R over a same single power line to which both the transmitting and receiving T/R are coupled. To mount a T/R on a power line, the T/R is stressed mechanically to enlarge an opening in the T/R through which the power line is passed into the T/R. The publication states that it is an object of the invention that the T/R be capable of being installed inexpensively and safely without interrupting service to the customer. However, the publication does not describe how this may be accomplished for high voltage power lines (contact with which is not allowed) and in particular for uninsulated high voltage power lines.

Further systems for inductive and capacitive coupling of a T/R to a power line are described, for example, in PCT publication WO 92/16920, the disclosure of which is incorporated herein by reference.

U.S. Pat. No. 6,407,987 to Abraham, the disclosure of which is incorporated herein by reference, describes couplers that have capacitive circuits serially connected with an air-core transformer. One of the described couplers is a differential capacitive coupler.

Not all coupling methods suitable for low voltage wires (e.g., up to about 250 Volts) may be used for medium voltage wires, i.e., above 2000 volts, generally above 6000 volts. For example, wires carrying higher voltages generally require larger capacitors which add higher distortion levels. In addition, the distance between high voltage wires is generally larger than for low voltage wires and therefore requires a relatively long wire length between the T/R and the high voltage wires. Such long wires generally add high distortion levels (e.g., phase skew) to the transmitted signals.

UK patent application GB 2,048,622, the disclosure of which is incorporated herein by reference, describes a device for reducing the amplitude of a signal in a conductor, in order to allow detection of one wire from a group of wires, without signals from the other wires interfering in the detection. The device includes an inductive sensor for sensing signals from the wire and an inductive signal injector to apply a counter signal to the wire.

SUMMARY OF THE PRESENT INVENTION

An aspect of some embodiments of the present invention relates to providing methods and apparatus for transmitting and receiving data signals over lines of a power line network, in which signals are transmitted and received differentially via a pair of lines in the network using inductive couplers. In accordance with an embodiment of the present invention, inductive coupling comprises inductively generating in the first and second lines first and second opposite polarity electromotive forces (EMFs) respectively. Optionally, the EMFs are substantially equal in magnitude. The opposite polarity EMFs generate opposite polarity currents in the respective lines that propagate along the pair of lines so as to propagate the signal along the pair of power lines.

According to an aspect of some embodiments of the present invention, a data signal transmitted over a pair of lines is sensed by sensing the opposite polarity currents in the pair of lines.

Electromagnetic noise in a same neighborhood of two relatively closely spaced lines tends to generate same polarity and magnitude currents in each of the lines. However, as noted above, in accordance with an embodiment of the present invention, same polarity changes in current in the lines generate opposite polarity EMFs in the transformer wire. As a result, electromagnetic noise tends not to generate substantial net EMFs in the transformer wire and sensitivity of the T/R to electromagnetic noise is reduced.

An aspect of some embodiments of the present invention relates to differentially transmitting data signals over a pair of medium or high voltage power lines, which are both electrified to a voltage level. The transmitted signals carried by each of the lines at any moment are substantially of same amplitude and opposite phase. To achieve as close an amplitude as possible and a highest phase difference as possible, the couplers used to connect the transmitter and/or the receiver to the power lines are optionally substantially identical. It is noted, however, that due to physical constraints, the amplitudes may differ between about 1–3% and/or the phase difference between the wires may be lower than 180°, and an actual phase difference of at least 150° and preferably above 170°, is considered opposite phase in accordance with the present invention.

An aspect of some embodiments of the present invention relates to providing a coupling unit for coupling a T/R to lines in a power line network. The coupling unit, in accordance with an embodiment of the present invention, comprises two separate couplers, each coupler connecting to a different line of the pair of lines. Optionally, the couplers are connected in parallel, with opposite polarity, through separate wires, to a single two-terminal port of the T/R. In some embodiments of the invention, the couplers are substantially identical having substantially the same wire length and the same resistance.

In some embodiments of the invention, the couplers comprise capacitive couplers. Alternatively, the couplers comprise inductive couplers. Each coupler optionally comprises at least one core formed from a magnetically permeable material that is mounted to the line to which the coupler couples the T/R. A wire, hereinafter a "transformer wire", connected to the T/R is wound around the at least one core in the coupler. Current generated in the transformer wire by the T/R generates a changing magnetic field in the at least one core and thereby an EMF in the line. A changing current in the line generates an EMF in the transformer wire that is sensed by the T/R.

A single transmission system, including a plurality of T/Rs may use only inductive couplers or only capacitive couplers. Alternatively, some of the T/Rs of the system may use inductive coupling while others include capacitive coupling. Further alternatively or additionally, the T/Rs use separate coupling for transmission and for reception. In some embodiments of the invention, the transmission coupling is capacitive while the reception coupling is inductive or vice versa.

In an embodiment of the invention a same transformer wire connected to the T/R provides current for the at least one core in each of the inductive couplers. The transformer wire is configured so that current flows around the at least one core in one of the couplers in a direction opposite to that of current flow around the at least one core in the other coupler. Therefore, a current generated in the wire by the T/R generates opposite polarity EMFs and thereby opposite polarity currents in the lines. Similarly, same polarity changes in current in the two lines generate opposite polarity EMFs in the transformer wire. Optionally, the number of windings of the transformer wire around the at least one core in each of the couplers is the same.

Alternatively to using a same transformer wire for both the couplers, in some embodiments of the invention, a separate wire is used for each of the couplers. Optionally, the separate wires are connected to the T/R in parallel, such that the signals sensed by the transformer wires are combined at the connection of the transformer wires to the T/R. Alternatively, each of the transformer wires is connected to a separate port of the T/R and the signals are combined within the decoder, for example after digitization and/or decoding of the signals.

In accordance with an embodiment of the present invention, each coupler comprises first and second parts and the at least one core in the coupler comprises first and second segments mounted respectively in the first and second parts. The first and second coupler parts may be separated and may be brought together and securely held one to the other using any of various mechanical means and configurations. By way of example, the two parts may be distanced from each other or closed together using a suitable bolt in a manner in which the jaws of a vise are opened and closed using a bolt. When the two coupler parts are brought together, the first and second segments of the at least one core are brought together to form the complete core.

To mount the coupler to a line, the two parts of the coupler are separated or distanced from each other. The line is positioned between the parts and the two parts brought together so that after being brought together the line is located and held in the open space at the center of the at least one core. The line may be positioned between the coupler parts and the coupler parts brought together using a suitable elongated insulated tool that enables a person installing the coupler to maintain a safe distance from the line during the installation process.

There is therefore provided in accordance with an embodiment of the present invention, a method of transmitting data over lines of power line network comprising: inductively generating opposite polarity currents representing the data on first and second lines of a pair of lines of the network at a first location along the lines that propagate along the lines; and sensing the propagated currents at a second location along the lines.

Optionally, the power line network is a low voltage power line network and at least one of the first and second lines is electrified with a voltage in excess of about 100 volts. Alternatively, the power line network is optionally a medium or high voltage power line network and at least one of the first and second lines is electrified with a voltage in excess of about 2 KV.

In some embodiments of the present invention, the opposite polarity currents are substantially equal.

In some embodiments of the present invention, inductively generating comprises inductively coupling a first magnetic circuit to the first line and a second magnetic circuit to the second line and generating opposite sense changes in the magnetic fields in each of the magnetic circuits, where the senses of the magnetic fields in the first and second magnetic circuits are determined relative to same sense directions along the first and second lines respectively.

Optionally, the first and second magnetic circuits respectively comprise first at least one and second at least one magnetically permeable cores, wherein each at least one core is wound with at least one loop of a conducting wire and inductively coupling the first and second magnetic circuits comprises mounting the first and second at least one magnetic core to the first and second lines respectively.

Optionally, generating opposite sense changes in the magnetic field in the first or second magnetic circuits comprises generating opposite sense current changes in wire loops wound about the at least one first and at least one second core, wherein the sense of a current change in the at least one wire loop wound about the first or second core is determined relative to the same direction used to determine the sense of the magnetic field in the first or second core.

In some embodiments of the present invention, the at least one loop wound around the first and/or second core comprises a plurality of loops. Optionally, the current change is generated in all the loops of the plurality of loops. Alternatively, the current change is generated in only a portion of the loops of the plurality of loops. In some embodiments of the present invention, the number of loops in which the current change is generated is less than or equal to four. In some embodiments of the present invention, the number of loops in which the current change is generated is less than or equal to three. In some embodiments of the present invention, the number of the plurality of loops is less than or equal to twenty. In some embodiments of the present invention, the number of the plurality of loops is less than or equal to ten.

In some embodiments of the present invention, generating opposite sense current changes comprises generating changes in currents that flow in same senses through the at least one loop wound about the first at least one core and second at least one core respectively.

In some embodiments of the present invention, generating opposite sense current changes comprises generating changes in currents that flow in opposite senses through the at least one loop wound about the first at least one core and second at least one core respectively.

Additionally or alternatively generating opposite sense currents comprises winding first and second wires about the first and second at least one cores respectively and generating a current change in the first wire and an opposite sense current change in the second wire.

Optionally, generating the opposite sense current changes comprises connecting the ends of the first wire and the ends of the second wire to a signal circuit that generates the current change. Optionally, each end of the first wire and an end of the second wire are connected to a same terminal connected to the signal circuit. Alternatively, at least one end of each wire is connected to a terminal connected to the signal circuit to which an end of the second wire is not connected. In some embodiments of the present invention, connecting the first and second wires comprises connecting the wires to the circuit via a transformer.

In some embodiments of the present invention, generating opposite sense currents comprises winding a same wire in opposite senses about the first at least one core and the second at least one core and generating a change in a current flowing through the wire. Optionally, generating a change in the current comprises connecting the ends of the wire to a signal circuit that generates the current change. Optionally, comprising twisting the wire around itself for a portion of its length between the signal circuit and the first at least one core and/or the second at least one core. Additionally or alternatively, connecting the wire to the circuit comprises connecting the wire to the circuit via a transformer.

In some embodiments of the present invention, the transformer is a center tapped transformer. In some embodiments of the present invention, mounting the first or second at least one core to a line comprises: forming first and second matching segments of the at least one core; mounting the first and second segments in first and second matching housings respectively; positioning the housings so that the line is located between the first and second core segments; and closing the first and second housing to each other so that the first and second segments of the at least one core meet and form a magnetic circuit that surrounds the line.

Optionally, the method comprises mounting a line guide to the first segment into which the line is placed to properly position the line between the first and second core segments. Alternatively or additionally, the first and second housings are coupled by a bolt that and closing the first and second housing to each other comprises turning the bolt. Optionally, the line is an overhead line and mounting the at least one core comprises hanging the coupled housings on the line by positioning the first housing so that the housing rests on the line and then turning the bolt. Additionally or alternatively, turning the bolt comprises turning the bolt using an insulated tool sufficiently long so that a safe distance from the line may be maintained during mounting. In some embodiments of the present invention, the line is a voltage carrying line that is electrified during mounting.

In some embodiments of the present invention, the method comprises sensing opposite polarity currents transmitted along the first and second lines to the first location and wherein sensing a propagated current comprises sensing a change in magnetic flux through a loop of the at least one loop generated by the current.

In some embodiments of the present invention, the first and second lines are uninsulated. In some embodiments of the present invention, at least one of the lines is a neutral line. In some embodiments of the present invention, both lines are voltage carrying lines.

In some embodiments of the present invention, generating current changes comprises generating current changes characterized by frequencies greater than about 2 MHz. In some embodiments of the present invention, generating current changes comprises generating current changes characterized by frequencies greater than about 4 MHz. In some embodiments of the present invention, generating current changes comprises generating current changes characterized by frequencies less than about 30 MHz.

There is further provided, in accordance with an embodiment of the present invention, apparatus for transmitting a signal over first and second lines of a pair of lines of a power line network the apparatus comprising: a first magnetic circuit inductively coupled to the first line; a second magnetic circuit inductively coupled to the second line; and a signal circuit that generates changes in magnetic flux in the first and second magnetic circuits responsive to the signal.

Optionally, the power line network is a low voltage power line network and at least one of the first and second lines is electrified with a voltage in excess of about 100 volts. Alternatively, the power line network is a medium or high voltage power line network and at least one of the first and second lines is electrified with a voltage in excess of about 2 KV.

In some embodiments of the present invention, the first and second magnetic circuits respectively comprise first at least one and second at least one magnetically permeable cores, wherein each at least one core is wound with at least one loop of a conducting wire connected to the circuit and wherein the circuit generates current changes in the at least one loop wound about each at least one core to generate the changes in magnetic flux.

Optionally, the at least one loop wound around the first and/or second core comprises a plurality of loops. In some embodiments of the present invention, the signal circuit generates current changes in all the loops of the plurality of loops. Alternatively, the signal circuit is connected to the plurality of loops so as to generate current changes in only a portion of the loops. In some embodiments of the present invention, the number of loops in which the current changes are generated is less than or equal to four. In some embodiments of the present invention, the number of loops in which the current change is generated is less than or equal to three.

In some embodiments of the present invention, the number of the plurality of loops is less than or equal to twenty.

In some embodiments of the present invention, the number of the plurality of loops is less than or equal to ten.

In some embodiments of the present invention, the number of loops wound about the first and/or second at least one core is less than four. In some embodiments of the present invention, the number of loops wound about the first and/or second at least one core is less than three.

In some embodiments of the present invention, a same wire is wound about the first and second at least one cores and wherein the sense of the winding of the wire about the first at least one core is opposite to that of the winding of the second at least one core, where the sense of winding about the first and second at least one core is determined relative to same sense directions along the first and second lines respectively. Optionally, the wire is twisted around itself for a portion of its length between the circuit and the first at least one core and/or the second at least one core. In some embodiments of the present invention, the wire is connected to the circuit via a transformer. Optionally, the transformer is a center-tapped transformer.

In some embodiments of the present invention, each at least one core comprises first and second matching segments which are brought together to form a magnetic circuit so that the magnetic circuit surrounds the line. Optionally, the apparatus comprises first and second matching housings in which the first and second segments are mounted. Optionally, the apparatus comprises a bolt coupled to the first and second housings that can be turned to separate the housings from each other or close the housings to each other so that the first and second segments of the at least one core meet and form the magnetic circuit. Optionally, the signal circuit senses opposite polarity currents representing a signal that are transmitted along the first and second lines to the first location by sensing changes in flux through a loop of the at least one loop wound respectively around the first and second cores generated by the currents.

In some embodiments of the present invention, the signal circuit generates flux changes characterized by frequencies greater than about 2 MHz. In some embodiments of the present invention, the signal circuit generates flux changes characterized by frequencies greater than about 4 MHz. In some embodiments of the present invention, the signal circuit generates flux changes characterized by frequencies less than about 30 MHz.

There is further provided, in accordance with an embodiment of the present invention, a coupler for inductively coupling a circuit to an electrified line, the coupler comprising: a first part having a first segment of at least one core formed from a magnetically permeable material; a second part having a second segment of the at least one core that matches the first segment; a wire, electrically connected to the circuit, that loops around at least one segment of the at least one core at least once; and a bolt coupled to the first and second parts turnable to separate the first and second parts from each other or close the first and second parts to each other so that the first and second segments of the at least one core meet and form a magnetic circuit that surrounds the line.

There is further provided, in accordance with an embodiment of the present invention, apparatus for transmitting a signal over a power line network, comprising a first coupling circuit adapted to couple to a first line of the network, a second coupling circuit adapted to couple to a second line of the network, a signal circuit, including at least one two-terminal port, adapted to transmit or receive electrical signals representative of data transmitted on the first and second lines, a first wire connected to a two-terminal port of the signal circuit and to the first coupling circuit, so as to transfer signals between the signal circuit and the first coupling circuit and a second wire connected to a two-terminal port of the signal circuit and to the second coupling circuit, so as to transfer signals between the signal circuit and the second coupling circuit.

Optionally, the first and second wires are connected to the same two terminal port of the signal circuit. Optionally, the first and second wires are connected to the same two terminal port of the signal circuit, with opposite orientation. Optionally, the first coupling circuit comprises an inductive coupling circuit. Optionally, the first coupling circuit includes a magnetic core and wherein the first wire is wound around the core one or more loops. Optionally, the first wire comprises a resistor parallel to the one or more loops. Optionally, the first coupling circuit comprises a capacitive coupling circuit. Optionally, the first wire comprises a resistor adjacent the first coupling circuit. Optionally, the resistance of the resistor is substantially equal to the typical resistance of the first wire.

BRIEF DESCRIPTION OF FIGURES

Non-limiting examples of embodiments of the present invention are described below with reference to figures attached hereto and listed below. In the figures, identical structures, elements or parts that appear in more than one figure are generally labeled with a same numeral in all the figures in which they appear. Dimensions of components and features shown in the figures are chosen for convenience and clarity of presentation and are not necessarily shown to scale.

DESCRIPTION OF EXEMPLARY EMBODIMENTS

Figure 1:
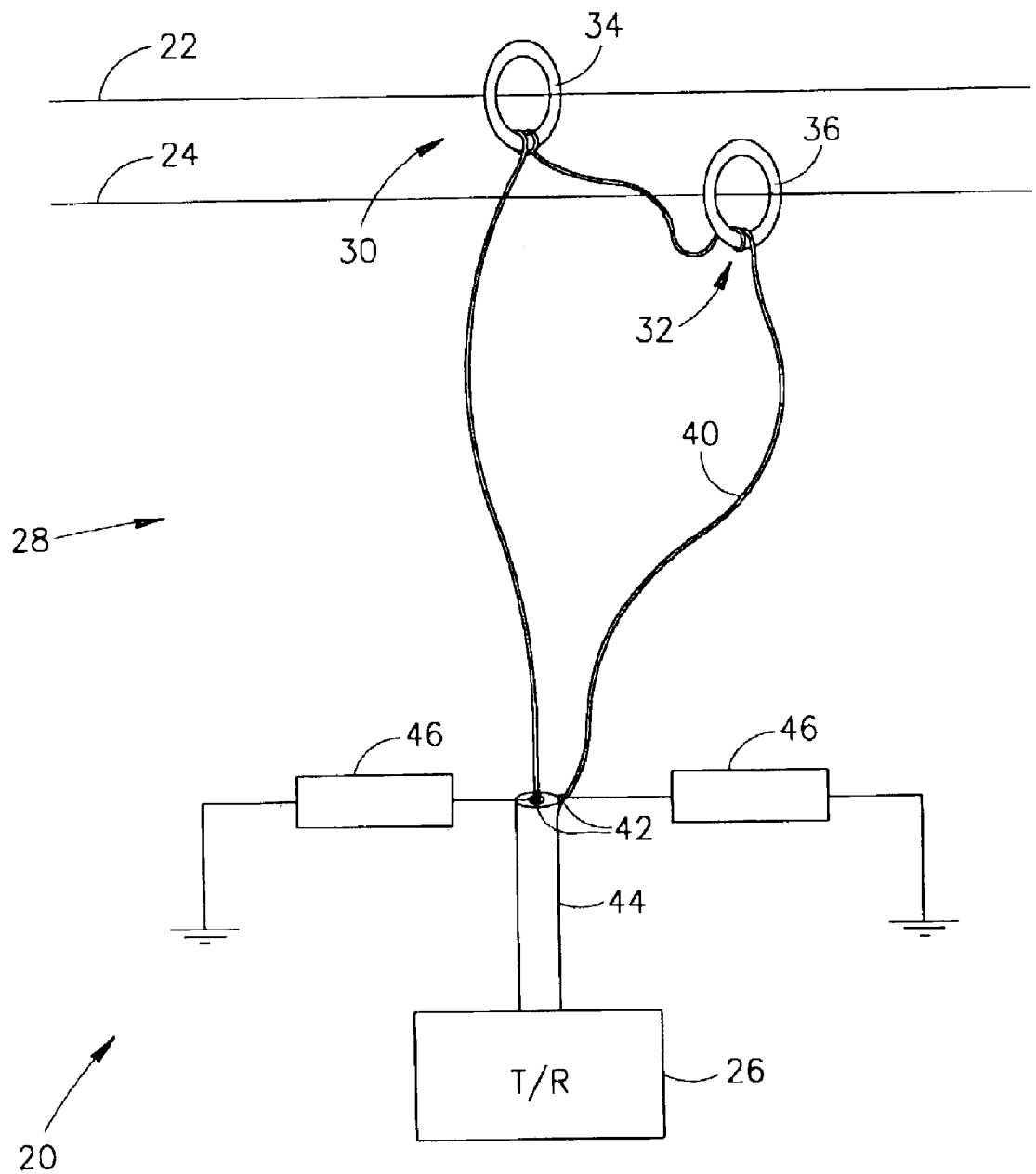
FIG. 1 is a schematic drawing of a system for transmission of data on a pair of lines in a power line network, in accordance with an embodiment of the present invention.

FIG. 1 schematically shows a system 20 for transmitting data signals over a pair of lines 22 and 24 in a power line network, in accordance with an embodiment of the present invention. System 20 is suitable for transmitting signals over lines in low voltage as well as medium and high voltage power line networks. However, the system is expected to be particularly advantageous for use in transmitting signals over medium and high voltage power line networks, such as for example power line networks that carry voltages in voltage ranges above about 2 Kilovolts. By way of example, lines 22 and 24 are assumed to be above ground lines in a medium or high voltage power line network. Both lines 22 and 24 may be high voltage lines or one of lines 22 and 24 may be a neutral line in the power line network. Lines 22 and 24 generally run parallel to each other distanced by a safety distance required due to the voltage levels they carry.

Although the present invention may be employed with lines 22 and 24 at any distance from each other, the present invention is especially advantageous when lines 22 and 24 are separated by more than half a meter or even a meter. As mentioned above, prior art methods are not suitable for lines separated by such distances.

System 20 optionally comprises a transmitter/receiver (T/R) 26 coupled to lines 22 and 24 by a coupling unit 28. In some embodiments of the invention, as is now described, the same coupling apparatus is used for both transmission by T/R 26 onto lines 22 and 24 and reception of signals from lines 22 and 24 by T/R 26. In an exemplary embodiment of the invention, coupling unit 28 comprises two inductive couplers 30 and 32. Inductive couplers 30 and 32 respectively optionally comprise at least one magnetically permeable core represented by a single core 34 and 36. Cores 34 and 36 are mounted on lines 22 and 24 respectively. Only features and elements of conductive couplers 30 and 32 germane to the discussion of system 20 are shown in FIG. 1.

In accordance with an embodiment of the present invention, a single wire 40, i.e. a transformer wire 40, is wound about both cores 34 and 36. Thus, a single transmission by T/R 26 onto wire 40 is sufficient to induce signals in both lines 22 and 24. Wire 40 is optionally wound about core 34 in an opposite sense to the sense in which wire 40 is wound about core 36. The winding of the wire in opposite directions causes inductive effects between wires 22 and 24 to intensify the transmitted signals rather than reduce or even cancel the transmitted signals. Optionally, the number of turns of transformer wire 40 about each of cores 34 and 36 is the same. Alternatively, the number of turns about each of cores 34 and 36 is different, for example when the noise conditions are expected to be different.

It is assumed that if lines 22 and 24 are uninsulated, transformer wire 40 is insulated with a suitable insulation known in the art that protects the wire from voltage on the lines. In addition assuming that lines 22 and 24 are outside lines and that transformer wire 40 is exposed to the weather, the insulation is also weather proof insulation that does not readily deteriorate as a result of exposure to sunlight and rain.

Ends 42 of transformer wire 40 are optionally connected to a two-terminal port of T/R 26 by a suitable connector, connectors or cable. In FIG. 1 ends 42 are shown, by way of example, connected to T/R 26 by a coaxial cable 44 which in turn is connected to T/R 26. It is assumed that transformer wire 40 is insulated with a suitable insulator that protects the wire from voltage on line 22 or 24. Optionally, the length of wire 40 from ends 42 to cores 34 and 36 is substantially the same, so that the amplitude of the transmitted signals on lines 22 and 24 is substantially the same and the phases of the signals are generally opposite, for example at least above 170° or even 175°.

T/R 26 transmits a signal over lines 22 and 24 to another T/R (not shown) coupled to the lines by transmitting a signal via coaxial cable 44 to transformer wire 40 that generates a corresponding current in the transformer wire. Since wire 40 is wound around cores 34 and 36 in opposite senses, the current in transformer wire 40 generates opposite polarity EMFs in lines 22 and 24. The opposite polarity EMFs generate opposite polarity currents in lines 22 and 24 and an associated potential difference between the lines, which propagate along the lines to the other T/R. The other T/R senses the transmitted signal by sensing the transmitted currents and/or associated voltage difference.

T/R 26 senses a signal transmitted over lines 22 and 24 by sensing opposite polarity changes that represent the signal in current in the lines. Opposite polarity changes in currents in lines 22 and 24 generate EMFs in transformer wire 40 that add and provide a voltage difference between ends 42 of the wire that is a sum of the generated EMFs. The voltage difference is transmitted to T/R via coaxial cable 44.

As mentioned above, coupling unit 28 in the embodiment shown in FIG. 1 is adapted to handle both transmission and reception of signals. In this embodiment, the number of turns of transformer wire 40 about each core 34 and 36 is optionally determined as a compromise between the optimum for transmission and the optimum for reception. Optionally, the number of turns about each core is relatively small, between 1 and 5, for example between 2–4. The relatively small number of turns of transformer wire 40 about cores 34 and 36 enables generating currents in lines 22 and 24 at relatively high frequencies in a range of between about 2–30 MHz and higher. As a result, data can be transmitted by system 20 over lines 22 and 24, in accordance with an embodiment of the present invention, at high data rates.

Alternatively to using the same number of turns for both transmission and reception, coupling unit 28 includes a switch (not shown) which changes the number of turns connected to T/R 26. Optionally, when T/R transmits signals, a command is sent to the switch to connect only some of the turns to wire 40. When T/R 26 is receiving signals, the switch is set to connect all the turns to wire 40. In some embodiments of the present invention, whereas a relatively small number of turns of wire 40 about a core are used to transmit signals over lines 22 and 24, a larger number of turns are used to sense signals transmitted over the lines. The larger number of turns used to sense signals improves sensitivity of T/R for sensing signals. In some embodiments of the present invention, a total number of turns about a core is between about 10–20, all of which are optionally utilized to receive signals, but only about 1–3 turns are used to transmit signals.

Further alternatively or additionally, separate couplers are used for transmitting and receiving signals, such that the number of turns, as well as other parameters of the coupling apparatus, may be optimized separately for transmission and reception, without requiring the use of a switch. Optionally, the coupling apparatus for the transmission and for the reception include the same cores 34 and 36, with different wires connecting the cores to T/R 26. Alternatively, different cores are used for transmission and reception. In some embodiments of the invention, the different cores are spaced from each other to reduce interference. Various methods known in the art may be used to couple a different number of loops of wire 40 to T/R 26 for transmitting signals than are coupled to the T/R for sensing signals. For example, for transmitting a signal, a tap may be connected to a loop intermediate a first and last loop of the loops wound about a core 34 and or core 36. Current changes used to transmit signals may then be generated in loops between the tapped loop and the first or last loop of the loops. Alternatively, first and second wires may optionally be wound around a core different number of times. One of the wires may be used for transmitting signals and the other wire used for sensing signals. For simplicity of presentation, it is assumed that a same number of loops is used to transmit and sense signals and that the number is sufficiently small to enable efficient generation of currents in lines 22 and 24 characterized by frequencies between 2 MHz and 30 MHz.

Whereas opposite polarity current changes in lines 22 and 24 provide EMFs that add, same polarity current changes in lines 22 and 24 generate EMFs in transformer wire 40 that subtract. A voltage difference between ends 42 of transformer wire 40 caused by same polarity current changes is substantially equal to a difference between the generated EMFs. As a result, sensitivity of T/R 26 to electromagnetic noise, which tends to generate same polarity current changes in lines 22 and 24, is substantially reduced.

In some embodiments of the invention, one or more high voltage protection devices 46 are connected between the ends 42 of wire 40 to a ground, which may be a ground line in the power line network. Since wire 40 feeds directly into low voltage circuitry, these protection devices protect both the circuitry and the locations to which they are connected from damaging and possibly lethal voltages. In some embodiments of the invention, high voltage protection devices 46 may be, for example, discharge tubes, or other devices for discharging over-voltages, as known in the art.

Figure 2A:
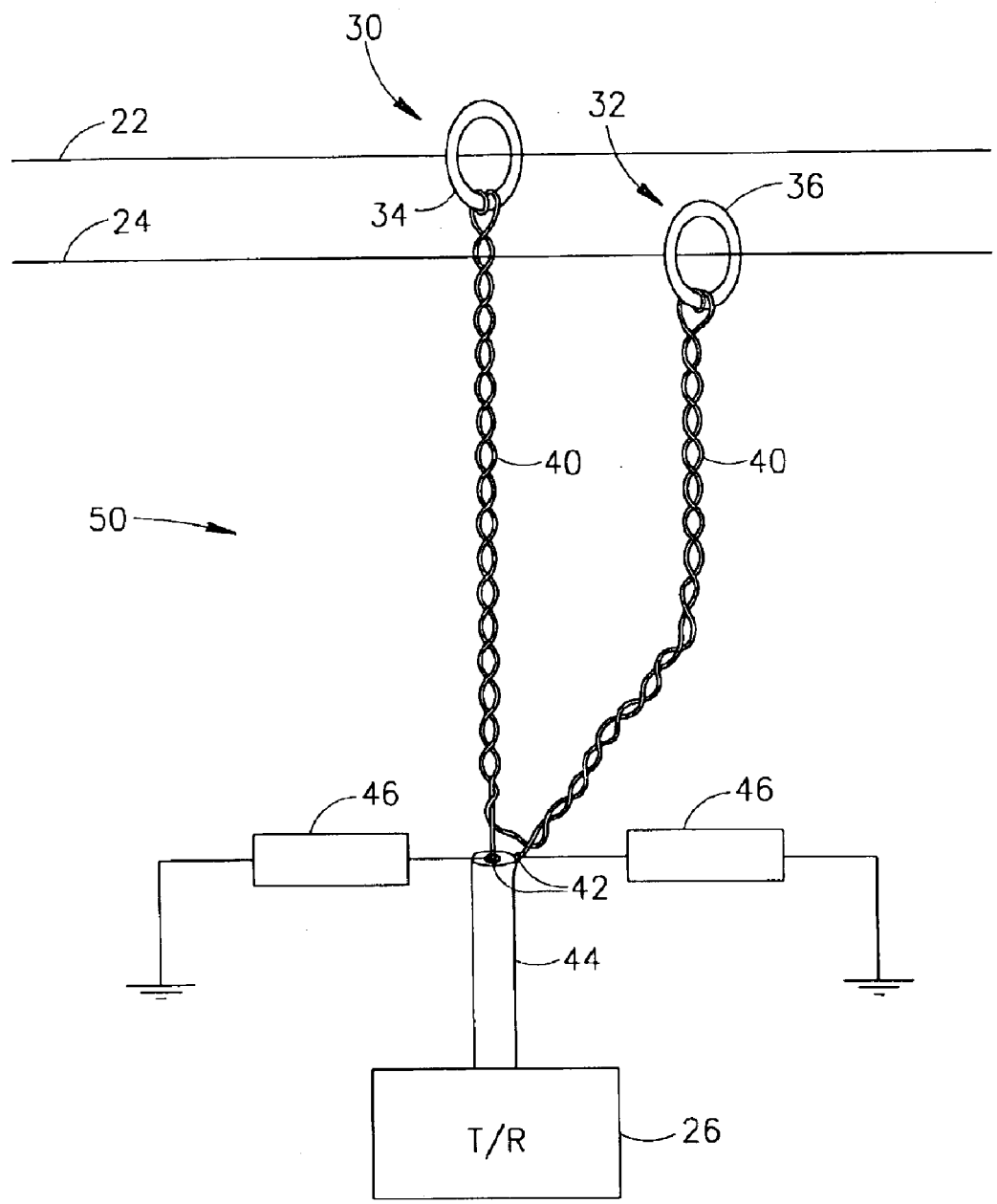
FIGS. 2A, 2B, 2C and 2D are schematic drawings of systems for transmission of data on a pair of lines in a power line network, in accordance with alternative embodiments of the present invention.

FIG. 2A schematically shows a system 50 for transmitting data signals over lines 22 and 24, in accordance with an embodiment of the present invention, that is a variation of system 20 shown in FIG. 1. In system 50, transformer wire 40 is twisted back on itself for a distance from each core 34 and 36 from the core almost to coaxial cable 44. Twisting transformer wire 40 tends to reduce noise transmitted by the wire to coaxial cable 44.

Figure 2B:
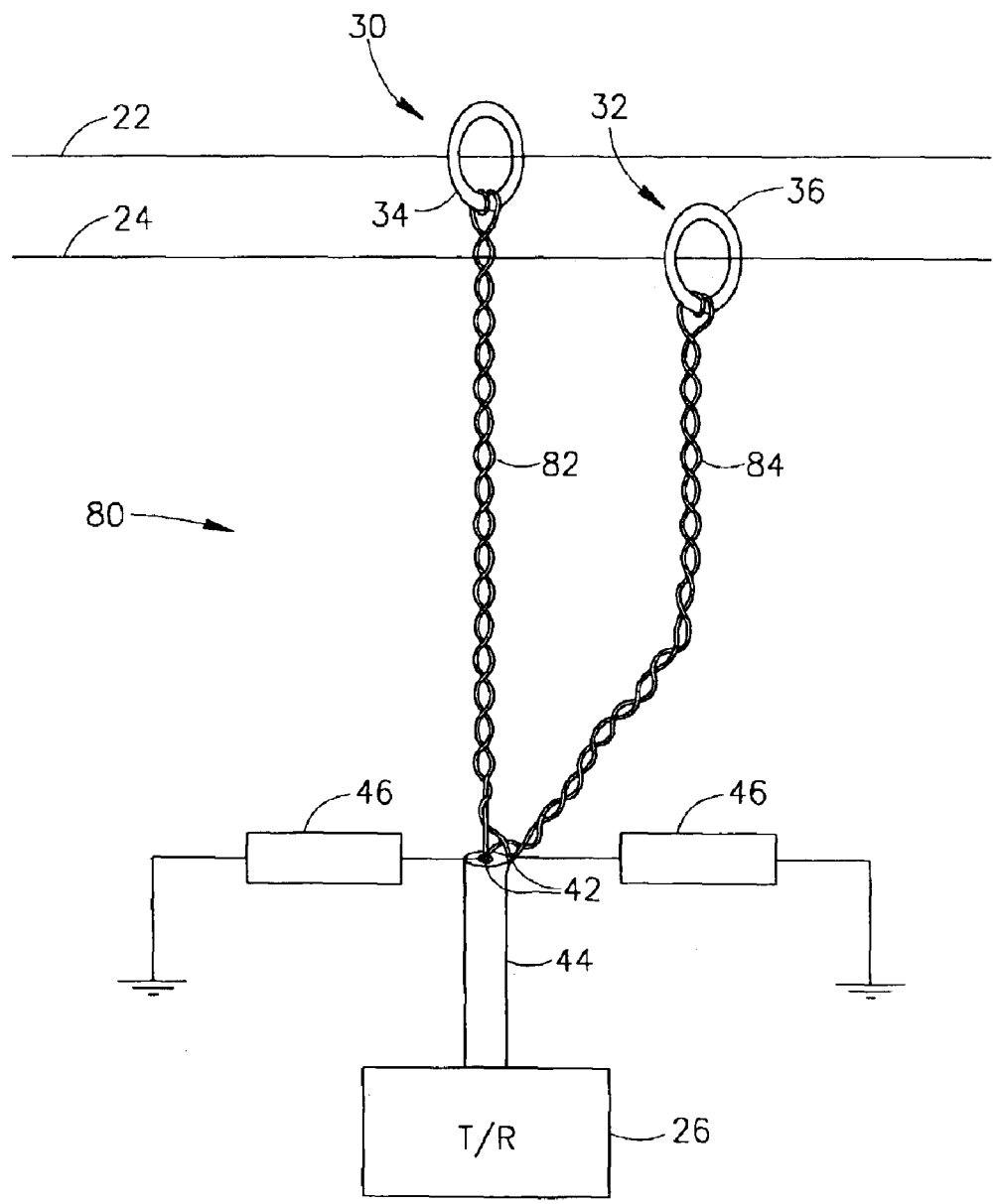

FIG. 2B schematically shows a system 80 for transmitting data signals over lines 22 and 24, in accordance with another embodiment of the present invention. In system 80, separate wires 82 and 84 connect cores 34 and 36 to coaxial cable 44. Using separate wires 82 and 84 generally reduces the noise added to transmitted signals from the inductive coupling, especially for high frequency signals and/or when the distance between coaxial cable 44 and lines 22 and 24 is relatively large.

Optionally, as shown in FIG. 2B, wires 82 and 84 are connected in parallel to coaxial cable 44. Alternatively, T/R 26 includes separate ports for each of wires 82 and 84. the signals from wires 82 and 84 are optionally combined after digitation and/or decoding. It is noted that wires 82 and 84 may be totally separate or may include a single wire connected in two middle points to coaxial cable 44.

Figure 2C:
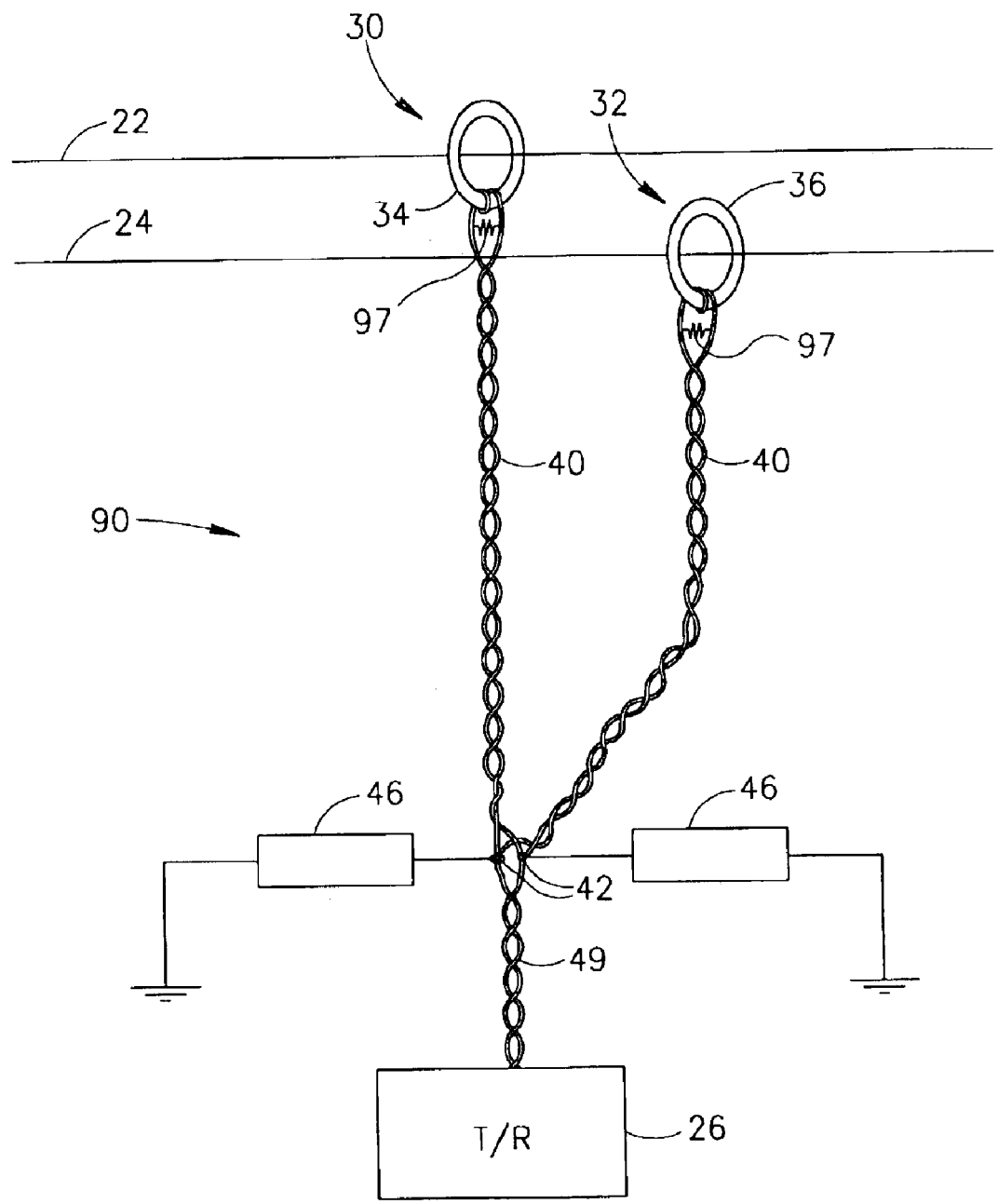

FIG. 2C schematically shows a system 90 for transmitting data signals over lines 22 and 24, in accordance with still another embodiment of the present invention. System 90 is similar to system 80, but is different in two unrelated details, each of which may be implemented separately without relation to the other. In system 90, instead of using a coaxial cable 44 to connect wires 40 to T/R 26, a twisted wire 49 is used. The use of twisted wire 49 generally reduces the noise added by the wire. The embodiment of FIG. 2C is especially useful when the length of twisted wire 49 is relatively large, e.g., above about half a meter. For short lengths of a few centimeters the use of coaxial cable 44 is generally suitable.

System 90 further illustrates resistors 97 in parallel to the wire turns around cores 34 and 36. Resistors 97 optionally have a resistance which is the typical resistance of wire 40, in order to maximize the energy in the vicinity of cores 34 and 36.

Figure 2D:
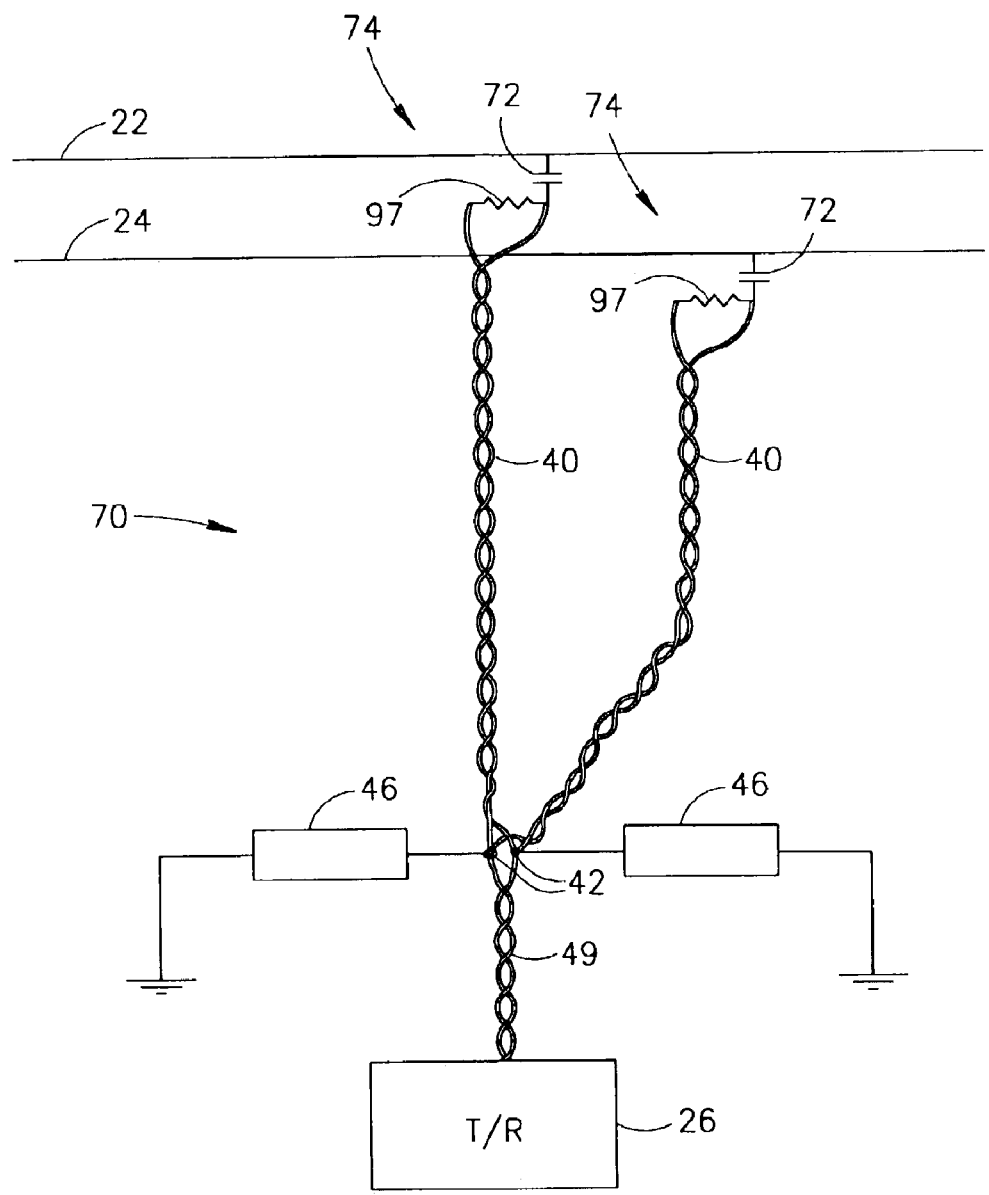

FIG. 2D schematically shows a system 70 for transmitting data signals over lines 22 and 24, in accordance with still another embodiment of the present invention. In system 70, T/R 26 is coupled to lines 22 and 24 using capacitive couplers 74. Each of couplers 74 optionally includes a capacitor 72 which is connected on one end to the power line 22 or 24 and on the other end to a wire 40. A resistor 97, having substantially the typical resistance of wire 40, is positioned along wire 40 near the connection point to capacitor 72. The wires 40 are connected to wire 44 with opposite directions, so that the signals are transmitted on wires 22 and 24 with opposite polarity. As in the above described inductive embodiments, the length of wires 40 and the parameters of couplers 74 are substantially the same, so that the signals have substantially same amplitudes and opposite phases. Wires 40 may be of substantially any length but are generally relatively long, e.g., between 4–7 meters.

Figure 3A:
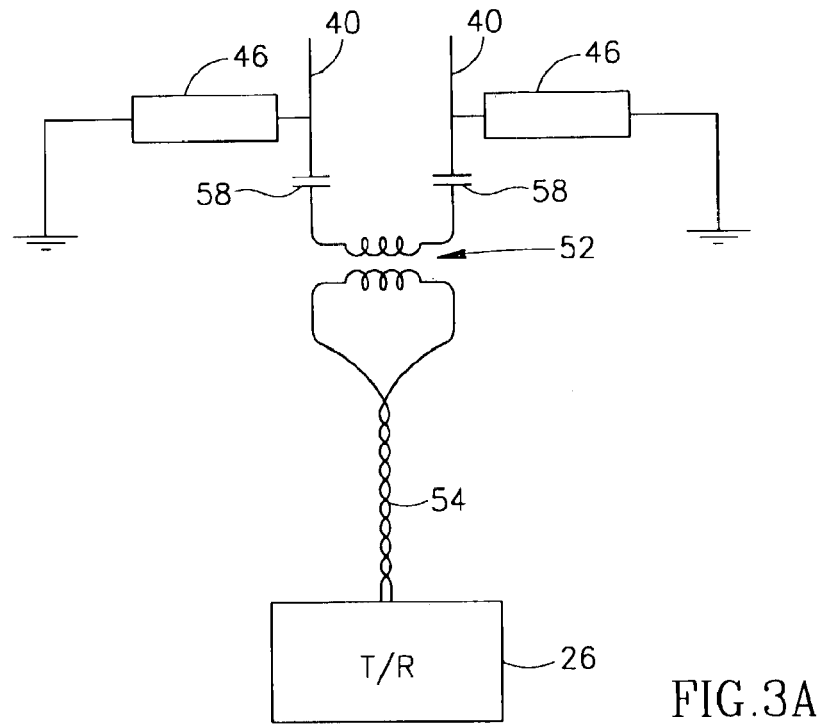
FIGS. 3A and 3B are schematic drawings of systems for connecting a T/R to a line in a power line network, in accordance with an embodiment of the present invention.
Figure 3B:
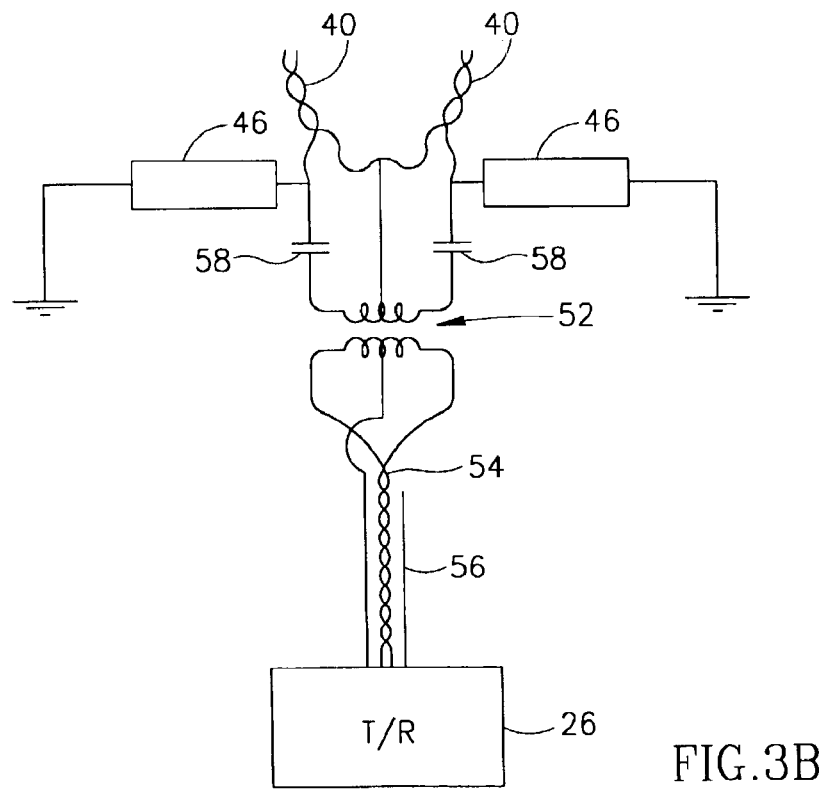

FIGS. 3A and 3B show an alternative methodology for connecting transformer wire 40 to T/R 26. In the embodiments shown in FIGS. 3A and 3B, ends 42 of transformer wire 40 are connected to a matching transformer 52. Matching transformer 52 is optionally connected to T/R 26 via a twisted pair 54. The use of a matching transformer may facilitate matching the impedance of lines 22 and 24 to that of T/R 26.

The connection shown in FIG. 3A corresponds to FIG. 1 and the connection shown in FIG. 3B corresponds to FIGS. 2A–2D. Optionally, the twisted pair is shielded, by a shield 56 as shown in FIG. 3B. Twisted pair 54 can also be a coaxial line 44 (as shown for example in FIG. 1). Optionally, as shown in FIG. 3B matching transformer 52 is a center-tapped transformer. Use of a center-tapped transformer provides a balanced line for which the opposite polarity EMFs generated in lines 22 and 24 by current in wire 40 have substantially equal magnitude.

In any of the embodiments shown, filters for the power line frequency and optionally its lower harmonics, may be inserted in lines along which the signals to or from the transmitter/receiver. Such filters may be as simple as blocking capacitors 58 (shown in FIGS. 3A and 3B) for the relatively low line frequency and harmonics or may include Pi or T filter sections, known in the art.

It is noted that whereas a single circuit is used to "drive" cores 34 and 36 and that the loops of wire about the respective cores are connected in series, other configurations of driving circuits and wiring configurations may be used to generate and sense opposite polarity currents in lines 22 and 24, in accordance with an embodiment of the present invention. For example, each core 34 and 36 may be wound with a different wire and each wire connected to a different circuit to generate and sense currents in lines 22 and 24. Other configurations for generating and sensing currents in lines 22 and 24 will occur to a person of the art.

Figure 4A:
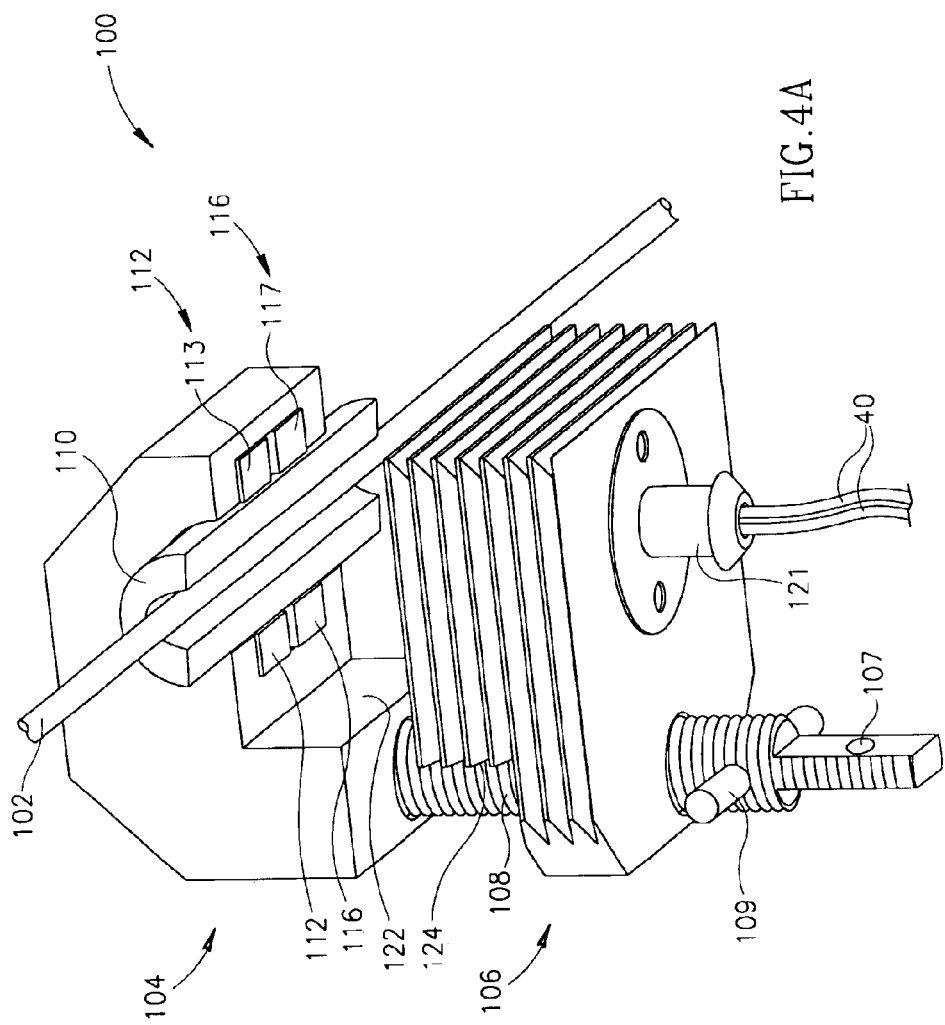
FIGS. 4A–4C show a coupler suitable for use in coupling a T/R to a line in a power line network, in accordance with an embodiment of the invention.
Figure 4B:
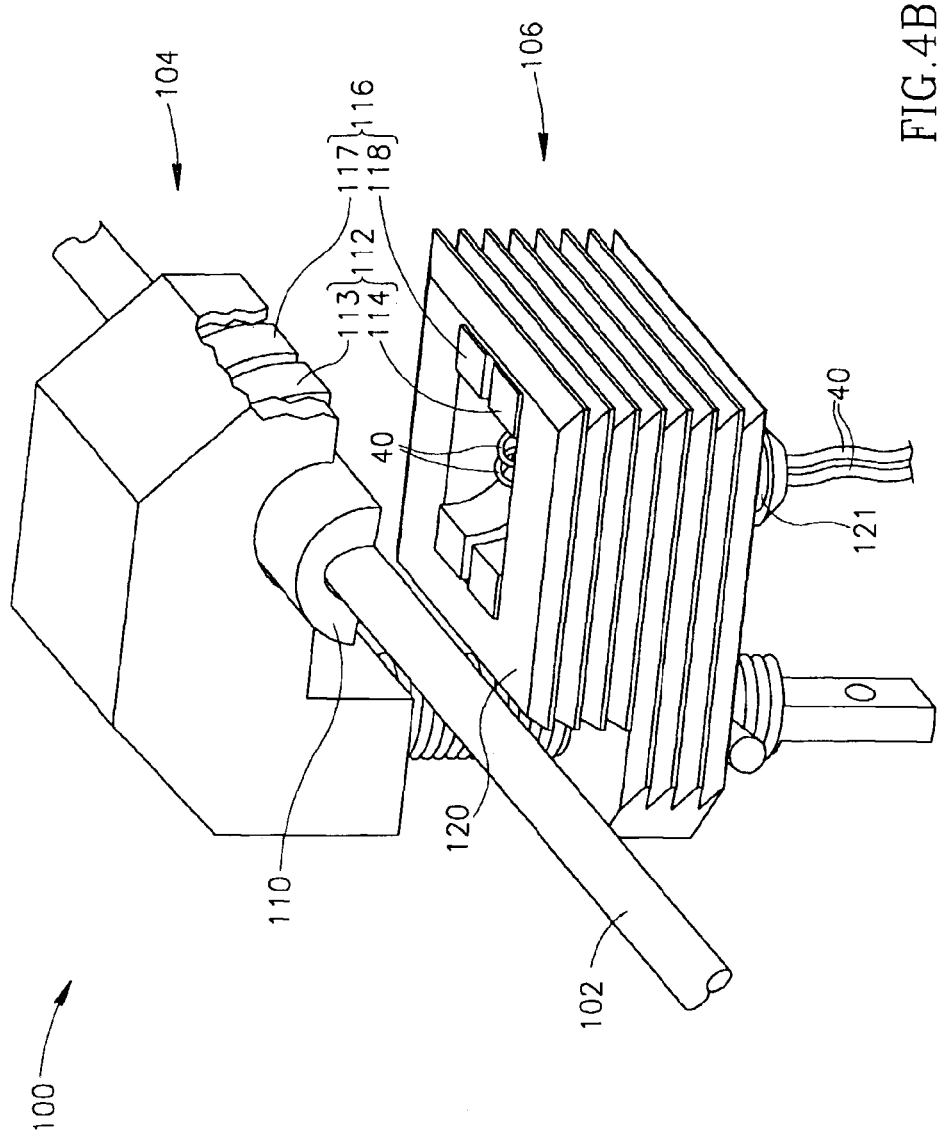
Figure 4C:
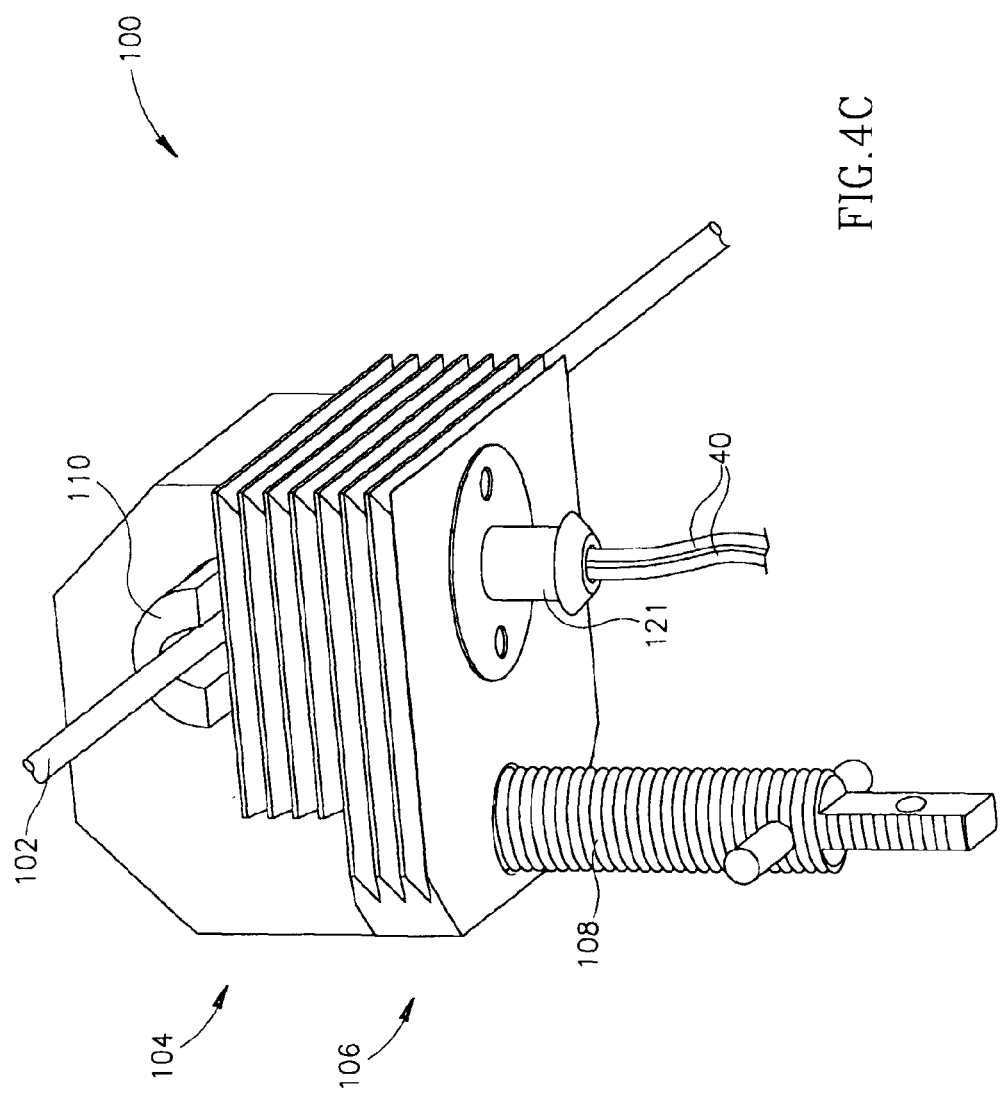

FIGS. 4A–4C schematically show an inductive coupler 100 suitable for use in a coupling unit for coupling a T/R (not shown) to a line in a power line network, in accordance with an embodiment of the invention. In FIGS. 4A–4C coupler 100 is shown being mounted to a line 102 in a power line network, which is by way of example assumed to be an overhead high voltage line.

Coupler 100 comprises top and bottom parts 104 and 106 that may be distanced from each other or brought together by a bolt 108 in a manner in which jaws of a vise are separated and brought together. Bolt 108 may conveniently be turned by a suitable optionally insulated wrench that couples to a hole 107 formed in the bolt or a cross-pin 109 formed in or inserted into the bolt. Top part 104 comprises a line guide 110 for positioning and securing line 102. Line guide 110 is optionally formed from an insulating material sufficient to electrically insulate coupler 100 from voltage carried on line 102.

Coupler 100 comprises, by way of example two cores 112 and 116 formed from a magnetically permeable material, such as a ferromagnetic material. Each of cores 112 and 116 comprises two matching segments, a top segment and a bottom segment. Top and bottom segments of each core 112 and 116 are comprised in top and bottom coupler parts 104 and 106 respectively. In FIG. 4A portions of top segments 113 and 117 of cores 112 and 116 are shown. FIG. 4B, in which top part 104 is partially cut away, shows both top and bottom segments of both cores 112 and 116. It is noted that a coupler, in accordance with an embodiment of the present invention, similar to coupler 100 may comprise more or less than one magnetically permeable core. The use of a plurality of cores rather than, for example, a single core may be used to reduce undesirable eddy currents.

A transformer wire 40 enters bottom part 106 optionally through an insulating collar 121 fit into a suitable aperture (not shown) in the bottom part and loops around each of bottom segments 114 and 118 of cores 112 and 116 as schematically shown in FIG. 4B. Transformer wire 40 optionally exits bottom part 106 through the same aperture through which it enters the bottom art. In FIG. 4B by way of example, transformer wire 40 loops around bottom segments 114 and 118 of cores 112 and 116 twice. The number of times transformer wire 40 loops around bottom segments 114 and 118 may be different from that shown in FIG. 4B. Transformer wire 40 is used to inductively couple a suitable T/R to cores 112 and 116 and thereby to line 102, for example, using a method shown in FIGS. 1–3B.

To mount coupler 100 to line 102 the coupler is "hung" from the line with the line positioned in guide 110 as shown in FIG. 4A. Bolt 108 is then turned to bring top and bottom parts 104 and 106 tightly together trapping line 102 inside guide 110 between the guide and a top surface 120 (FIG. 4B) of bottom part 106. Bottom part 106 is optionally formed from an insulating material sufficient to electrically insulate coupler 100 and elements thereof from voltage carried on line 102. Optionally, top surface 120 is covered with a suitable insulating material to insulate bottom part 106 and elements of coupler 100 from voltage on line 102.

Transformer wire 40 is insulated with a suitable, preferably all weather insulation that insulates wire 40 from voltage in line 102. Any of various insulation materials and configurations known in the art and rated for voltages required to insulate wire 40 from voltage on line 102 may be used in the practice of the present invention. In addition, top segments 114 and 118 are optionally formed and positioned in top and bottom parts 104 and 106 so that they do not come in contact with and are distanced from line 102 when the top and bottom parts are brought together. It is noted that line guide 110 also optionally insulates top segments 113 and 117 from line 102.

It is noted that coupler 100 may be positioned and top and bottom parts 104 and 106 closed together using a properly insulated tool that is sufficiently long to enable an installer to position and close the coupler while maintaining a safe distance from line 102. For example, assuming that line 102 is an overhead line, any of various tools known in the art may be used to lift coupler 100 from the ground to the line and hang the coupler on the line. A suitable elongated insulated wrench that couples to cross-pin 109 and/or hole 107 may be used by an installer standing on the ground or on a suitable elevated installation platform to turn bolt 108 and close coupler 100. The wrench, which may be a part of the lifting tool or separate from the lifting tool, may for example comprise a pole having at an end thereof a socket that fits over bolt 108 and locks onto cross-pin 109. Alternatively, the wrench may for example, have at the end of the pole a pin that fits into hole 107.

When top and bottom parts 104 and 106 are clamped together by bolt 108, top segments 113 and 117 of cores 112 and 116 meet and are pressed together to bottom segments 114 and 118 respectively to complete magnetic circuits that surround line 102. To assure proper completion of the magnetic circuits when closed, top and bottom parts 104 and 106 are advantageously accurately registered one to the other to assure that top and bottom segments of cores 112 and 116 are accurately aligned. By way of example, in coupler 100 a surface 122 of top part 104 and a surface 124 of bottom part 106 are used to register the top and bottom parts. Surfaces 122 and 124 are positioned relative to bolt 108 so that coupler 100 cannot be closed unless the surfaces are accurately parallel. Other methods of accurately registering top and bottom parts 104 and 106 of coupler 100 to each other will readily occur to a person of the art. For example, top and bottom parts 104 and 106 may be fitted with guide rods and matching guide rod holes.

It is noted that generally, when differential signals are transmitted on two electrical lines, the coupling induces the signals, although to a lesser extent, onto other electrical lines parallel the lines on which the signals are transmitted. In some embodiments of the invention, this coupling between parallel wires is utilized, in communicating between transceivers coupled to different pairs of wires. For example, in neighborhoods in which a first phase line leads to a first group of houses and a second phase line leads to a second group of houses, a single transceiver connects to one of the first and second wires at a point at which they are parallel to each other, such that the signals are applied to both the first and second wires, due to the parallel inductance. Alternatively or additionally, a repeater is used to transfer signals between the first and second lines, when necessary. The repeater optionally includes two pairs of cores. A first pair of cores connects, for example, to the ground line and the first phase line and the second pair of cores connects to the ground line and the second phase line. Optionally, the turns around the cores of the first pair and the respective cores of the second pair are wound in the same direction for the repetition of the signals.

Although the above description relates to differential transmission using inductive coupling, the principles of the invention may be used for differential transmission using other coupling methods, e.g., capacitive coupling. Using capacitive coupling is generally simpler as it does not require paying attention to the directions of the turns of the inductive coupling and does not involve the cross talk levels that generally appear in inductive coupling.

Although the above methods are particularly useful for transmission of signals on medium and high voltage power lines, some or all of the methods of the present invention may be used for transmission on low voltage power lines, having a voltage beneath 300 volts (e.g., 110 or 220).

In the description and claims of the present application, each of the verbs, "comprise" "include" and "have", and conjugates thereof, are used to indicate that the object or objects of the verb are not necessarily a complete listing of members, components, elements or parts of the subject or subjects of the verb.

The present invention has been described using detailed descriptions of embodiments thereof that are provided by way of example and are not intended to limit the scope of the invention. The described embodiments comprise different features, not all of which are required in all embodiments of the invention. Some embodiments of the present invention utilize only some of the features or possible combinations of the features. Variations of embodiments of the present invention that are described and embodiments of the present invention comprising different combinations of features noted in the described embodiments will occur to persons of the art. The scope of the invention is limited only by the following claims.

What is claimed is:

1. A method of transmitting data over lines of a power line network, comprising:
   inductively inducing substantially opposite polarity currents representing the data, on first and second lines of the network, at a first location along the lines; and
   sensing the propagated currents from the first and second lines at a second location along the lines.

2. A method according to claim 1, wherein the power line network is a low voltage power line network and at least one of the first and second lines is electrified with a voltage lower than 300 volts.

3. A method according to claim 1, wherein the power line network is a medium or high voltage power line network and at least one of the first and second lines is electrified with a voltage above about 2 KV.

4. A method according to claim 1, wherein the substantially opposite polarity currents are substantially equal in amplitude.

5. A method according to claim 1, wherein inducing substantially opposite polarity currents comprises inducing currents having a phase difference of at least 170° substantially throughout the duration of transmission of the data.

6. A method according to claim 1, wherein inducing substantially opposite polarity currents comprises inducing currents having a phase difference of at least 175° substantially throughout the duration of transmission of the data.

7. A method according to claim 1, comprising coupling a first magnetic circuit to the first line and a second magnetic circuit to the second line and wherein inducing the currents comprises generating opposite sense changes in the magnetic fields in each of the magnetic circuits, where the senses of the magnetic fields in the first and second magnetic circuits are determined relative to same sense directions along the first and second lines respectively.

8. A method according to claim 7, wherein the first and second magnetic circuits comprise magnetically permeable first and second cores.

9. A method according to claim 7, wherein inductively inducing the opposite polarity currents in the lines comprises inducing currents in first and second rings coupled around the first and second lines, respectively.

10. A method according to claim 9, wherein inductively inducing currents in the first and second rings comprises inducing currents on one or more wires wound at least one loop around the first and second rings.

11. A method according to claim 10, wherein the one or more wires comprise a single wire for both the first and second rings.

12. A method according to claim 10, wherein the one or more wires comprise separate wires for the first and second rings.

13. A method according to claim 9, wherein the at least one loop wound around the cores comprises a plurality of loops around each of the cores.

14. A method according to claim 13, wherein the current is induced in all the loops of the plurality of loops.

15. A method according to claim 13, wherein the current is induced in only a portion of the loops of the plurality of loops.

16. A method according to claim 15, and comprising sensing opposite polarity currents transmitted along the first and second lines to the first location and wherein sensing a propagated current comprises sensing a change in magnetic flux through all the loops.

17. A method according to claim 10, wherein the number of loops in which the current is induced is less than or equal to four.

18. A method according to claim 13, wherein the number of the plurality of loops is less than or equal to ten.

19. A method according to claim 10, wherein generating opposite sense current changes comprises generating changes in currents that flow in same senses through the at least one loop wound around each of the cores respectively.

20. A method according to claim 10, wherein generating opposite sense current changes comprises generating changes in currents that flow in opposite senses through the at least one loop wound about the cores respectively.

21. A method according to claim 20, wherein generating opposite sense currents comprises winding first and second wires about the first and second magnetic circuits respectively and generating a current change in the first wire and an opposite sense current change in the second wire.

22. A method according to claim 21, wherein generating the opposite sense current changes comprises connecting the ends of the first wire and the ends of the second wire to a signal circuit that generates the current change.

23. A method according to claim 22, wherein each end of the first wire and an end of the second wire are connected to a same terminal connected to the signal circuit.

24. A method according to claim 22, wherein at least one end of each wire is connected to a terminal connected to the signal circuit to which an end of the second wire is not connected.

25. A method according to claim 22, wherein the first and second wires are connected to the circuit via a transformer.

26. A method according to claim 20, wherein generating opposite sense currents comprises winding a same wire in opposite senses about the first at least one magnetic circuit and the second at least one magnetic circuit and generating a change in a current flowing through the wire.

27. A method according to claim 26, wherein generating a change in the current comprises connecting the ends of the wire to a signal circuit that generates the current change.

28. A method according to claim 27, and comprising twisting the wire around itself for a portion of its length between the signal circuit and the cores.

29. A method according to claim 27, wherein connecting the wire to the circuit comprises connecting the wire to the circuit via a transformer.

30. A method according to claim 29, wherein the transformer is a center tapped transformer.

31. A method according to claim 8, wherein mounting the first or second core to a line, comprises:
   forming first and second matching segments of the core;
   mounting the first and second segments in first and second matching housings respectively;
   positioning the housings so that the line is located between the first and second core segments; and
   closing the first and second housing to each other so that the first and second segments of the core meet and form a magnetic circuit that surrounds the line.

32. A method according to claim 31, and comprising mounting a line guide to the first segment into which the line is placed to properly position the line between the first and second core segments.

33. A method according to claim 31, wherein the first and second housings are coupled by a bolt that and closing the first and second housing to each other comprises turning the bolt.

34. A method according to claim 33, wherein the line is an overhead line and mounting the at least one core comprises hanging the coupled housings on the line by positioning the first housing so that the housing rests on the line and then turning the bolt.

35. A method according to claim 32, wherein turning the bolt comprises turning the bolt using an insulated tool sufficiently long so that a safe distance from the line may be maintained during mounting.

36. A method according to claim 31, wherein the line is a voltage carrying line that is electrified during mounting.

37. A method according to claim 1, wherein the first and second lines are uninsulated.

38. A method according to claim 1, wherein at least one of the lines is a neutral line.

39. A method according to claim 1, wherein both lines are voltage carrying lines.

40. A method according to claim 1, wherein generating current changes comprises generating current changes characterized by at least one frequency greater than about 2 MHz.

41. Apparatus for transmitting a signal over first and second lines of a power line network, comprising:
a first magnetic circuit adapted to inductively couple to the first line;
a second magnetic circuit adapted to inductively couple to the second line;
an input interface adapted to receive data for transmission; and
a signal circuit adapted to induce electrical signals representative of the received data in both the first and second magnetic circuits, with substantially opposite polarity, concurrently.

42. Apparatus according to claim 41, wherein the first and second magnetic circuits are coupled to the signal circuit through a single wire.

43. Apparatus according to claim 41, wherein the first and second magnetic circuits are coupled to the signal circuit through separate wires.

44. Apparatus according to claim 41, wherein the power line network is a medium or high voltage power line network and at least one of the first and second lines is electrified with a voltage in excess of about 2 KV.

45. Apparatus according to claim 41, wherein the first and second magnetic circuits respectively comprise first at least one and second at least one magnetically permeable cores.

46. Apparatus according to claim 45, wherein each at least one core is wound with at least one loop of a conducting wire connected to the circuit.

47. Apparatus according to claim 46, wherein the at least one loop wound around the first and second core comprises a plurality of loops.

48. Apparatus according to claim 47, wherein the signal circuit generates current changes in all the loops of the plurality of loops.

49. Apparatus according to claim 47, wherein the signal circuit is connected to the plurality of loops so as to generate current changes in a portion of the loops.

50. Apparatus according to claim 49, wherein the signal circuit senses opposite polarity currents representing a signal that are transmitted along the first and second lines to the first location by sensing changes in flux through all the loops wound respectively around the first and second cores.

51. Apparatus according to claim 47, wherein the number of loops in which the current changes are generated is less than or equal to four.

52. Apparatus according to claim 47, wherein the number of the plurality of loops is less than or equal to ten.

53. Apparatus according to claim 46, wherein a same wire is wound about the first and second at least one cores.

54. Apparatus according to claim 53, wherein the sense of the winding of the wire about the first at least one core is opposite to that of the winding of the second at least one core, where the sense of winding about the first and second at least one core is determined relative to same sense directions along the first and second lines respectively.

55. Apparatus according to claim 46, wherein different wires are wound about the first and second at least one cores.

56. Apparatus according to claim 46, wherein the wire is twisted around itself for a portion of its length between the circuit and the magnetic circuit.

57. Apparatus according to claim 41, wherein the wire is connected to the circuit via a transformer.

58. Apparatus according to claim 57, wherein the transformer is a center tapped transformer.

59. Apparatus according to claim 46, wherein each at least one core comprises first and second matching segments which are brought together to form a magnetic circuit so that the magnetic circuit surrounds the line.

60. Apparatus according to claim 59, and comprising first and second matching housings in which the first and second segments are mounted.

61. Apparatus according to claim 60, and comprising a bolt coupled to the first and second housings that can be turned to separate the housings from each other or close the housings to each other so that the first and second segments of the at least one core meet and form the magnetic circuit.

62. Apparatus according to claim 41, wherein the signal circuit generates flux changes characterized by frequencies greater than about 2 MHz.

63. Apparatus for transmitting a signal over a power line network, comprising:
a first coupling circuit adapted to couple to a first line of the network;
a second coupling circuit adapted to couple to a second line of the network;
a signal circuit, including at least one two-terminal port, adapted to transmit or receive electrical signals representative of data transmitted on the first and second lines;
a first wire connected to a two-terminal port of the signal circuit and to the first coupling circuit, so as to transfer signals between the signal circuit and the first coupling circuit; and
a second wire connected to a two-terminal port of the signal circuit and to the second coupling circuit, so as to transfer signals between the signal circuit and the second coupling circuit.

64. Apparatus according to claim 63, wherein the first and second wires are connected to the same two terminal port of the signal circuit.

65. Apparatus according to claim 64, wherein the first and second wires are connected to the same two terminal port of the signal circuit, with opposite orientation.

66. Apparatus according to claim 63, wherein the first coupling circuit comprises an inductive coupling circuit.

67. Apparatus according to claim 66, wherein the first coupling circuit includes a magnetic core and wherein the first wire is wound around the core one or more loops.

68. Apparatus according to claim 67, wherein the first wire comprises a resistor parallel to the one or more loops.

69. Apparatus according to claim 63, wherein the first coupling circuit comprises a capacitive coupling circuit.

70. Apparatus according to claim 63, wherein the first wire comprises a resistor adjacent the first coupling circuit.

71. Apparatus according to claim 63, wherein the resistance of the resistor is substantially equal to the typical resistance of the first wire.

\* \* \* \* \*